United States Patent
Jha et al.

(10) Patent No.: US 11,108,642 B2
(45) Date of Patent: Aug. 31, 2021

(54) METHOD AND APPARATUS FOR NON-INTRUSIVE AGENTLESS PLATFORM-AGNOSTIC APPLICATION TOPOLOGY DISCOVERY

(71) Applicant: VMWARE, INC., Palo Alto, CA (US)

(72) Inventors: Ritesh Jha, Bangalore (IN); Soumya Panigrahi, Bangalore (IN); Nikhil Jaiswal, Bangalore (IN); Pushkar Patil, Bangalore (IN); Suchit Dhakate, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 165 days.

(21) Appl. No.: 16/441,041

(22) Filed: Jun. 14, 2019

(65) Prior Publication Data
US 2020/0336384 A1 Oct. 22, 2020

(30) Foreign Application Priority Data

Apr. 22, 2019 (IN) .............................. 201941015949

(51) Int. Cl.
*H04L 12/24* (2006.01)
*G06F 9/455* (2018.01)
*H04L 29/08* (2006.01)

(52) U.S. Cl.
CPC .............. *H04L 41/12* (2013.01); *G06F 9/455* (2013.01); *H04L 41/145* (2013.01); *H04L 67/10* (2013.01); *G06F 9/45541* (2013.01)

(58) Field of Classification Search
None
See application file for complete search history.

(56) References Cited

U.S. PATENT DOCUMENTS

| | | | | |
|---|---|---|---|---|
| 9,027,024 | B2 * | 5/2015 | Mick | H04L 41/5054 718/1 |
| 9,300,553 | B2 * | 3/2016 | Dube | G06F 9/45558 |
| 2013/0238785 | A1 * | 9/2013 | Hawk | G06F 9/5077 709/224 |
| 2013/0304903 | A1 * | 11/2013 | Mick | H04L 67/10 709/224 |
| 2015/0235308 | A1 * | 8/2015 | Mick | G06F 9/5088 705/26.3 |
| 2015/0312110 | A1 * | 10/2015 | Dube | H04L 67/10 709/226 |

(Continued)

OTHER PUBLICATIONS

Wikipedia, "Independent component analysis", https://en.wikipedia.org/wiki/Independent_component_analysis, 15 pages, retrieved Jul. 10, 2020, 15 pgs.

(Continued)

*Primary Examiner* — Ranodhi Serrao
(74) *Attorney, Agent, or Firm* — Loza & Loza, LLP

(57) ABSTRACT

System and computer-implemented method for constructing a topology for an application distributed over multiple virtual computing instances in which a set of resource utilization metrics are collected for multiple computing instances. A propagation sequence caused by an execution of the application is determined based on the set of resource utilization metrics. A graph may be created with the propagation sequence, wherein each virtual computing instance in the multiple computing instances is a possible node in the graph and the graph includes all nodes associated with the application.

20 Claims, 16 Drawing Sheets

(56) References Cited

U.S. PATENT DOCUMENTS

| | | | |
|---|---|---|---|
| 2016/0139885 A1* | 5/2016 | Dube | H04L 41/14 717/101 |
| 2016/0142265 A1* | 5/2016 | Dube | G06F 8/20 709/223 |
| 2016/0241444 A1* | 8/2016 | Maes | G06F 9/5072 |
| 2016/0255095 A1* | 9/2016 | Maes | H04L 41/12 726/1 |
| 2017/0302537 A1* | 10/2017 | Maes | H04L 41/0893 |
| 2018/0121226 A1 | 5/2018 | Liu | |
| 2018/0287876 A1 | 10/2018 | Strobel et al. | |

OTHER PUBLICATIONS

Wikipedia, "Signal separation", https://en.wikipedia.org/wiki/Blind_signal_separation, 4 pages, retrieved Jul. 10, 2020, 4 pgs.

Wikipedia, "Component (graph theory)", https://en.wikipedia.org/wiki/Connected_component_(graph_theory), retrieved Jul. 10, 2020, 3 pgs.

Scikit, "Blind source separation using FastICA", https://scikit-learn.org/stable/auto_examples/decomposition/plot_ica_blind_source_separation.html, retrieved Jul. 10, 2020, 2 pgs.

Microservice Architecure, "What are Microservices", https://microservices.io/, retrieved Jul. 10, 2020, 13 pgs.

Wikipedia, "Smoothing", https://en.wikipedia.org/wiki/Smoothing, retrieved Jul. 10, 2020, 6 pgs.

Wikipedia, "Savitzky-Golay filter", https://en.wikipedia.org/wiki/Savitzky%E2%80%93Golay_filter, retrieved Jul. 10, 2020, 15 pgs.

Scipy.org, "Compressed sparse graph routines", https://docs.scipy.org/doc/scipy/reference/sparse.csgraph.html, retrieved Jul. 10, 2020, 4 pgs.

\* cited by examiner

API-1

Nodes:

API-2

Nodes:

API-3

Nodes:

API-4

Nodes:

API-5

Nodes:

API-6

Nodes:

METHOD AND APPARATUS FOR NON-INTRUSIVE AGENTLESS PLATFORM-AGNOSTIC APPLICATION TOPOLOGY DISCOVERY

RELATED APPLICATIONS

Benefit is claimed under 35 U.S.C. 119(a)-(d) to Foreign Application Serial No. 201941015949 filed in India entitled "METHOD AND APPARATUS FOR NON-INTRUSIVE AGENTLESS PLATFORM-AGNOSTIC APPLICATION TOPOLOGY DISCOVERY", on Apr. 22, 2019, by VMware, Inc., which is herein incorporated in its entirety by reference for all purposes.

BACKGROUND

Cloud architectures are used in cloud computing and cloud storage systems for offering infrastructure-as-a-service (IaaS) cloud services. Examples of cloud architectures include the VMware Cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual computing instances (VCIs), e.g., virtual machines (VMs), and logical networks.

The services described above may be provided by a private cloud that includes one or more customer data centers (referred to herein as "on-premise data centers"). The services may also be provided by a public cloud that includes a multi-tenant cloud architecture providing IaaS cloud services. A hybrid cloud system aggregates the resource capability from both private and public clouds.

As cloud infrastructures grow in size and complexity, it is becoming more vital for Cloud Operations (Cloud-Ops) teams to have a complete view of all applications deployed on their infrastructures, which includes information about the interactions of these applications, and the interdependencies among various nodes hosting the applications. Availability of this information allows Cloud-Ops teams to effectively plan application segmentation and migration, as well as perform troubleshooting. Additionally, with the advent of microservices architecture, which is an architectural approach that structures an application as a collection of services that may be loosely coupled and independently deployable, an API call can span across microservices hosted on multiple nodes. The distributed aspect of the microservices architecture causes difficulties for the Cloud-Ops team to root-cause the issues without having the full view of the application topology and the interaction among the nodes hosting the microservices. Thus, application topology discovery is becoming a very critical requirement for the cloud operations.

Currently, there are multiple solutions for application topology discovery, but they are either based on application resource tagging, which needs to be performed manually, or require application discovery agents on all the nodes that would participate in application discovery. Manual application tagging approach as required by many currently available tools is too cumbersome and unmanageable for environments having thousands of VMs/Containers. On the other hand, the agent-based approach as used by currently available tools has multiple limitations in the enterprise domain. As these agents are located on the same nodes that hosts the applications, they not only impact the application performance to some extent but also raises security concerns. Additionally, it also enforces complex installation and maintenance lifecycles.

SUMMARY

In general, various aspects of the disclosed approach for application topology determination provides for capturing, tracking, and inferring information from node disturbances propagating through a compute node space. As detailed herein, these node disturbances are related to resource use changes for compute nodes. These resource use changes may be based on changes in use of resources by compute nodes, such as processing (e.g., CPU) resources or networking resources. Other types of resources may be considered. The approach described herein can infer an application topology with a very high accuracy level. The approach does not require installation of any additional agent on compute nodes and hence is a completely agentless and intrusion-free solution. Also, because the approach does not rely on the kind of platform on which it is implemented, the approach is universally applicable for any platform environment.

A computer-implemented method for constructing a topology for an application distributed over multiple virtual computing instances in accordance with an embodiment of the invention includes collecting a set of resource utilization metrics for the multiple virtual computing instances; determining a propagation sequence caused by an execution of the application based on the set of resource utilization metrics; and creating a graph with the propagation sequence, wherein each virtual computing instance in the multiple computing instances is a possible node in the graph and the graph includes all nodes associated with the application. In some embodiments, the steps of this method are performed when program instructions contained in a computer-readable storage medium are executed by one or more processors.

A system of multiple computing environments including an application distributed over the multiple virtual computing instances includes memory and one or more processors configured to collect a set of resource utilization metrics for the multiple virtual computing instances; determine a propagation sequence caused by an execution of the application based on the set of resource utilization metrics; and create a graph with the propagation sequence, wherein each virtual computing instance in the multiple computing instances is a possible node in the graph and the graph includes all nodes associated with the application.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
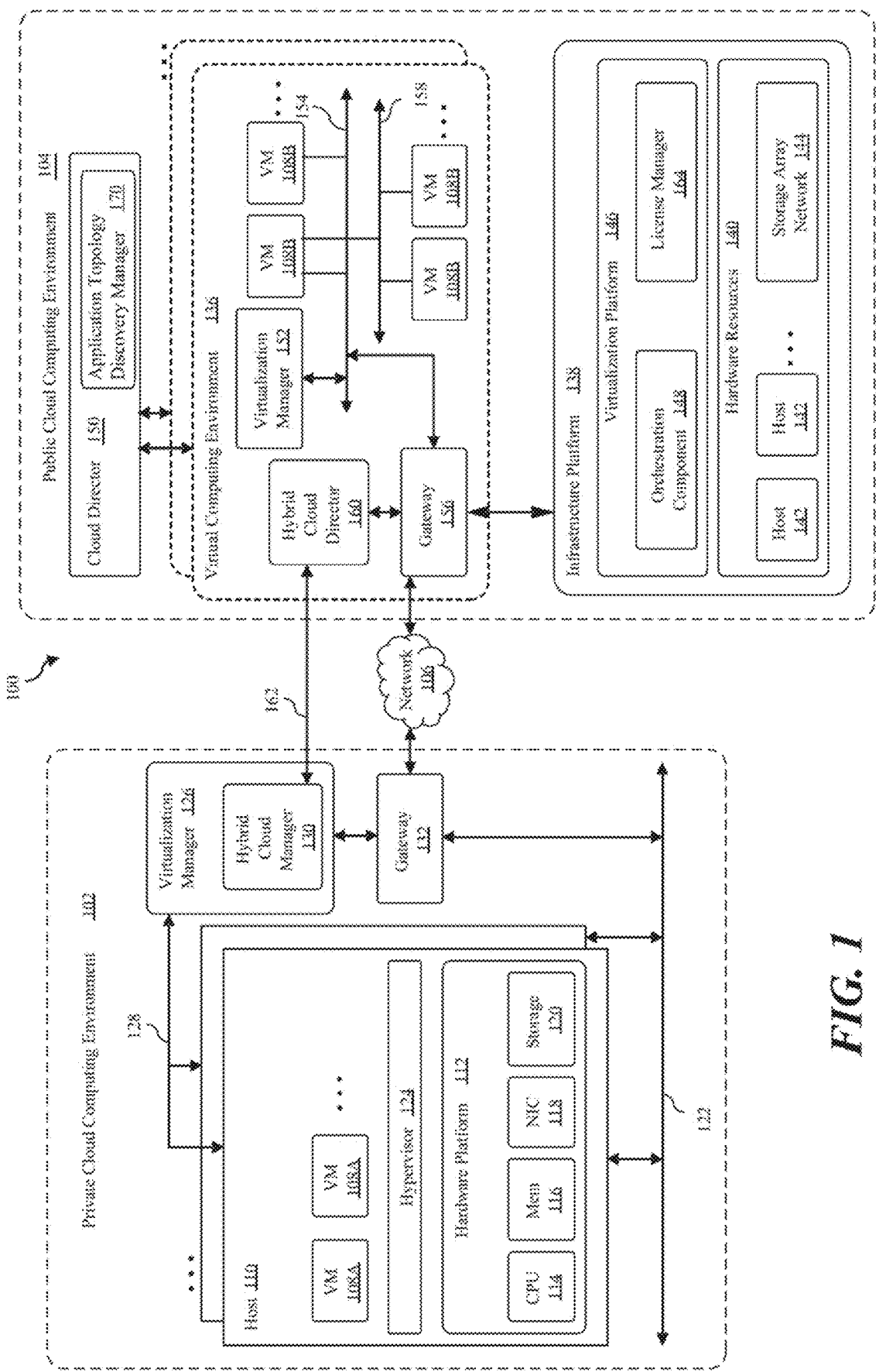
FIG. 1 is a block diagram of a hybrid cloud system that may be used to describe a method and apparatus for agentless platform-agnostic application topology discovery configured in accordance with various aspects of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," "one aspect," "an aspect," "various aspects," or similar language means that a particular feature, structure, or characteristic described in connection with the indicated embodiment is included in at least one embodiment of the present invention. Thus, the phrases "in one embodiment," "in an embodiment," "in one aspect," "in an aspect," "in various aspects," and similar language throughout this specification may, but do not necessarily, all refer to the same embodiment.

The following terms and their definitions may be used herein:

Compute Environment: Corresponds to any software-defined data center (SDDC) or cloud that host applications.

Compute Node: Any instance in a compute environment that runs a service/component of an application. The terms "node" or "virtual computing instance" may be used in place of "compute node," and it should be understood that these terms are interchangeable unless otherwise specified.

Compute Node Space: Corresponds to the set of compute nodes that are a part of some applications.

Node Disturbance: Any increase in resource (e.g., CPU, network, etc.) usage of the compute node beyond its idle-state range.

Node Disturbance Sequence: Chronological sequence of compute nodes that experience node disturbances.

Vector: An array of numeric values.

Super Vector: A large-sized vector generated by concatenating other (small-sized) vectors.

Various aspects of the present disclosure for application topology determination provides for capturing, tracking, and inferring information from node disturbances propagating through a compute node space to determine application topology. For example, when an API call is made to an application, it may propagate, or traverse, through multiple compute nodes—causing an increase in the CPU utilization metric of the respective compute nodes on which it is processed. This increase in CPU utilization metric beyond its idle-state range is considered as a node disturbance. In an embodiment, information about these node disturbances, generated throughout the compute node space from various API calls, are captured over a period of time and an application topology may be inferred therefrom. Specifically, these node disturbances are captured and modeled as signals that propagate as ripples through the compute node space when the application is used.

Many examples provided herein for performing application topology determination discuss using CPU utilization information of compute nodes for node disturbance capture and analysis. However, it should be noted that the concepts presented herein should not be limited to only CPU utilization information, and various aspects of the disclosure applies to other types of resource utilization related to compute nodes. For example, network utilization information may be another metric that may be used instead of, or in addition to, CPU utilization information.

Turning now to FIG. 1, a block diagram of a hybrid cloud system 100 in accordance with an embodiment of the invention is shown. The hybrid cloud system 100 includes at least one private cloud computing environment 102 and at least one public cloud computing environment 104 that are connected via a network 106. The hybrid cloud system 100 is configured to provide a common platform for managing and executing workloads seamlessly between the private and public cloud computing environments. In one embodiment, the private cloud computing environment 102 may be controlled and administrated by a particular enterprise or business organization, while the public cloud computing environment 104 may be operated by a cloud computing service provider and exposed as a service available to account holders, such as the particular enterprise in addition to other enterprises. In some embodiments, the private cloud computing environment 102 may be a private or on-premise data center.

The private cloud computing environment 102 and public cloud computing environment 104 of the hybrid cloud system 100 include computing and/or storage infrastructures to support a number of virtual computing instances 108A and 108B. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

Continuing to refer to FIG. 1, the private cloud computing environment 102 of the hybrid cloud system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions such as, for example, executable instructions that may be used to perform one or more operations described herein and may be stored in the memory 116 and the storage system 120. The memory 116 is volatile memory used for retrieving programs and processing data. The memory 116 may include, for example, one or more random access memory (RAM) modules. The network interface 118 enables the host 110 to communicate with another device via a communication medium, such as a network 122 within the private cloud computing environment. The network interface 118 may be one or more network adapters, also referred to as a Network Interface Card (NIC). The storage system 120 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host.

Each host 110 may be configured to provide a virtualization layer that abstracts processor, memory, storage, and networking resources of the hardware platform 112 into the virtual computing instances, the virtual machines 108A, that run concurrently on the same host. The virtual machines run on top of a software interface layer, which is referred to herein as a hypervisor 124, that enables sharing of the hardware resources of the host by the virtual machines. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system. of the host or directly on hardware components of the host. For other types of virtual computing instances, the host may include other virtualization software platforms to support those virtual computing instances, such as Docker virtualization platform to support software containers.

The private cloud computing environment 102 includes a virtualintion manager 126 that communicates with the hosts 110 via a management network 128. In one embodiment, the virtualization manager 126 is a computer program that resides and executes in a computer system, such as one of the hosts, or in a virtual computing instance, such as one of the virtual machines 108A running on the hosts. One example of the virtualization manager 126 is the VMware vCenter Server® product made available from VMware, Inc. The virtualization manager 126 is configured to carry out administrative tasks for the private cloud computing environment, including managing the hosts, managing the VMs running within each host, provisioning VMs, migrating VMs from one host to another host, and load balancing between the hosts.

In one embodiment, the virtualization manager 126 includes a hybrid cloud manager 130 configured to manage and integrate computing resources provided by the private cloud computing environment 102 with computing resources provided by the public cloud computing environment 104 to form a unified "hybrid" computing platform. The hybrid cloud manager is configured to deploy virtual computing instances, e.g., virtual machines 108A, in the private cloud computing environment, transfer VMs from the private cloud computing environment to the public cloud computing environment, and perform other "cross-cloud" administrative tasks. In one implementation, the hybrid cloud manager 130 is a module or plug-in to the virtualization manager 126, although other implementations may be used, such as a separate computer program executing in any computer system or running in a virtual machine in one of the hosts. One example of the hybrid cloud manager 130 is the VMware® HCX™ product made available from VMware, Inc.

In one embodiment, the hybrid cloud manager 130 is configured to control network traffic into the network 106 via a gateway device 132, which may be implemented as a virtual appliance. The gateway device 132 is configured to provide the virtual machines 108A and other devices in the private cloud computing environment 102 with connectivity to external devices via the network 106. The gateway device 132 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

The public cloud computing environment 104 of the hybrid cloud system 100 is configured to dynamically provide an enterprise (or users of an enterprise) with one or more virtual computing environments 136 in which an administrator of the enterprise may provision virtual computing instances, e.g., the virtual machines 108B, and install and execute various applications in the virtual computing instances. The public cloud computing environment includes an infrastructure platform 138 upon which the virtual computing environments can be executed. In the particular embodiment of FIG. 1, the infrastructure platform includes hardware resources 140 having computing resources (e.g., hosts 142), storage resources (e.g., one or more storage array systems, such as a storage area network (SAN) 144), and networking resources (not illustrated), and a virtualization platform 146, which is programmed and/or configured to provide the virtual computing environments 136 that support the virtual machines 108B across the hosts 142. The virtualization platform may be implemented using one or more software programs that reside and execute in one or more computer systems, such as the hosts 142, or in one or more virtual computing instances, such as the virtual machines 108B, running on the hosts.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by, running on the hosts 142 VMware ESXi™-based hypervisor technologies provided by VMware, Inc. However, the virtualization platform may be implemented using any other virtualization technologies, including Xen®, Microsoft Hyper-V® and or Docker virtualization technologies, depending on the virtual computing instances being used in the public cloud computing environment 104.

In one embodiment, the public cloud computing environment 104 may include a cloud director 150 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 148 to instantiate the requested virtual machines (e.g the virtual machines 108B). One example of the cloud director is the VMware vCloud Director® product from VMware, Inc. The public cloud computing environment 104 may be VMware cloud (VMC) on Amazon Web Services (AWS).

In one embodiment, at least some of the virtual computing environments 136 may be configured as virtual data centers. Each virtual computing environment includes one or more virtual computing instances, such as the virtual machines 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the virtual machines 108B running in that environment and managed by at least one networking gateway device 156, as well as one or more isolated internal networks 158 not connected to the gateway device 156. The gateway device 156, which may be a virtual appliance, is configured to provide the virtual machines 108B and other components in the virtual computing environment 136 with connectivity to external devices, such as components in the private cloud computing environment 102 via the network 106. The gateway device 156 operates in a similar manner as the gateway device 132 in the private cloud computing environment.

In one embodiment, each virtual computing environments 136 includes a hybrid cloud director 160 configured to communicate with the corresponding hybrid cloud manager 130 in the private cloud computing environment 102 to enable a common virtualized computing platform between the private and public cloud computing environments. The hybrid cloud director may communicate with the hybrid cloud manager using Internet-based traffic via a VPN tunnel established between the gateways 132 and 156, or alternatively, using a direct connection 162. The hybrid cloud director and the corresponding hybrid cloud manager facilitate cross-cloud migration of virtual computing instances, such as virtual machines 108A and 108B, between the private and public computing environments. This cross-cloud migration may include both "cold migration" in which the virtual machine is powered off during migration, as well as "hot migration" in which the virtual machine is powered on during migration. As an example, the hybrid cloud director 160 may be a component of the HCX-Cloud product and the hybrid cloud manager 130 may be a component of the HCX-Enterprise product, which are provided by VMware, Inc.

Referring still to FIG. 1, in one embodiment, the cloud director 150 includes an application topology discovery manager 170 that may be used for application topology determination. The application topology discovery manager 170 may be used to capture, track, and infer information from node disturbances propagating through a compute node space. Although further details about the application topology discovery manager 170 are provided herein, it should be noted that the application topology discovery manager 170, which is shown to be included in the cloud director 150 in the public cloud computing environment 104, may be placed in any compute environment, whether that environment is private, public, or hybrid.

An operation for application topology determination in accordance with an embodiment of the invention is described with reference to a process flow diagram 200 shown in FIG. 2. Reference will also be made to FIGS. 4-10 in the following description, each of which include a compute node space diagram with an associated node disturbance graph. In order to simplify the description of the main aspects of the application topology determination approach provided herein, a hypothetical scenario where only one API call occurs at a time will first be presented. Then, a scenario where the application topology determination approach is being used in a more complex, realistic scenario will be described.

Figure 4:
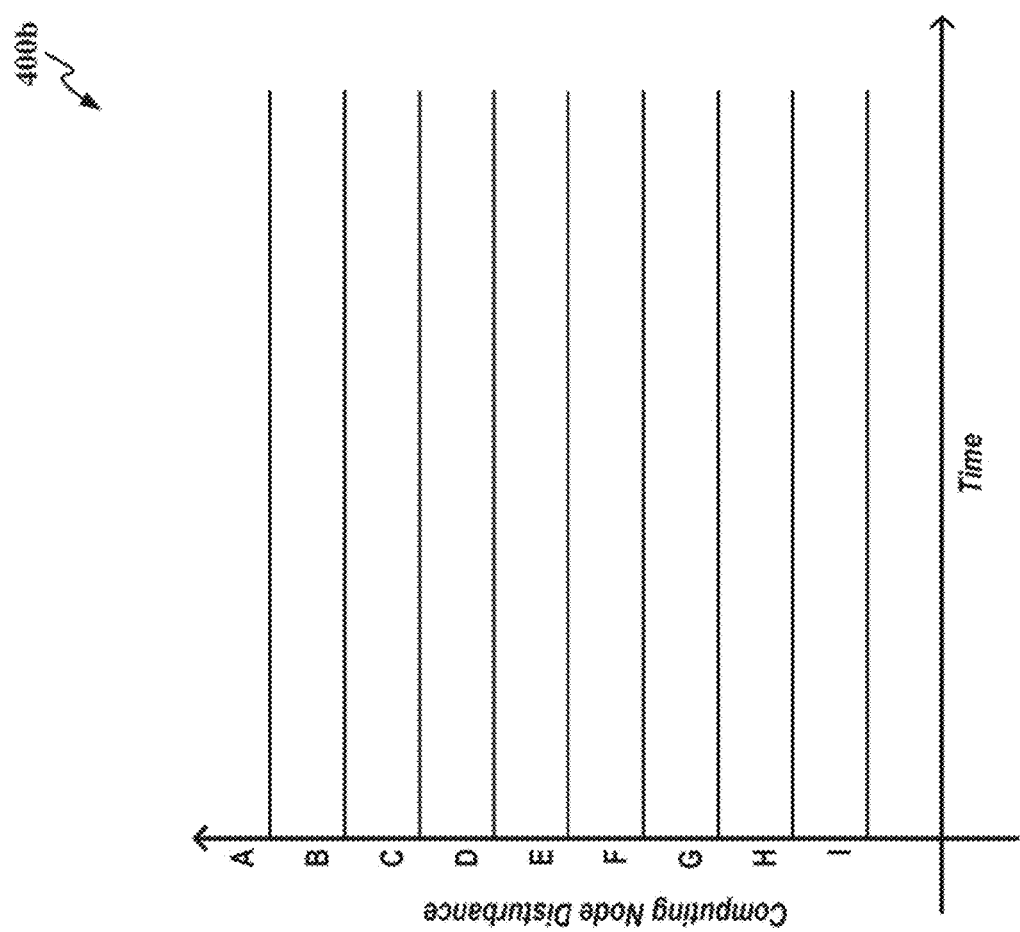
FIGS. 4-10 are compute node space diagrams with associated compute node disturbance graphs that may be used to explain various aspects of the operation of the invention.
Figure 4:
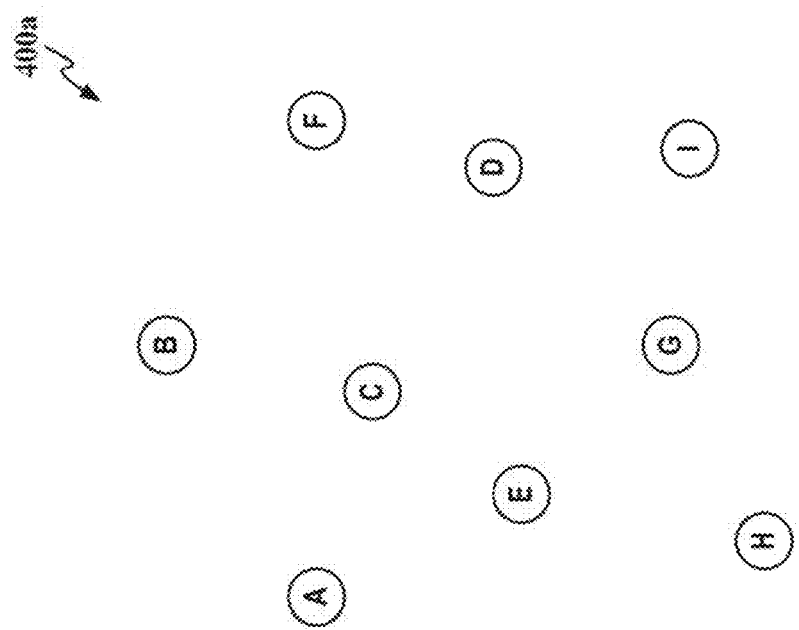
Figure 5:
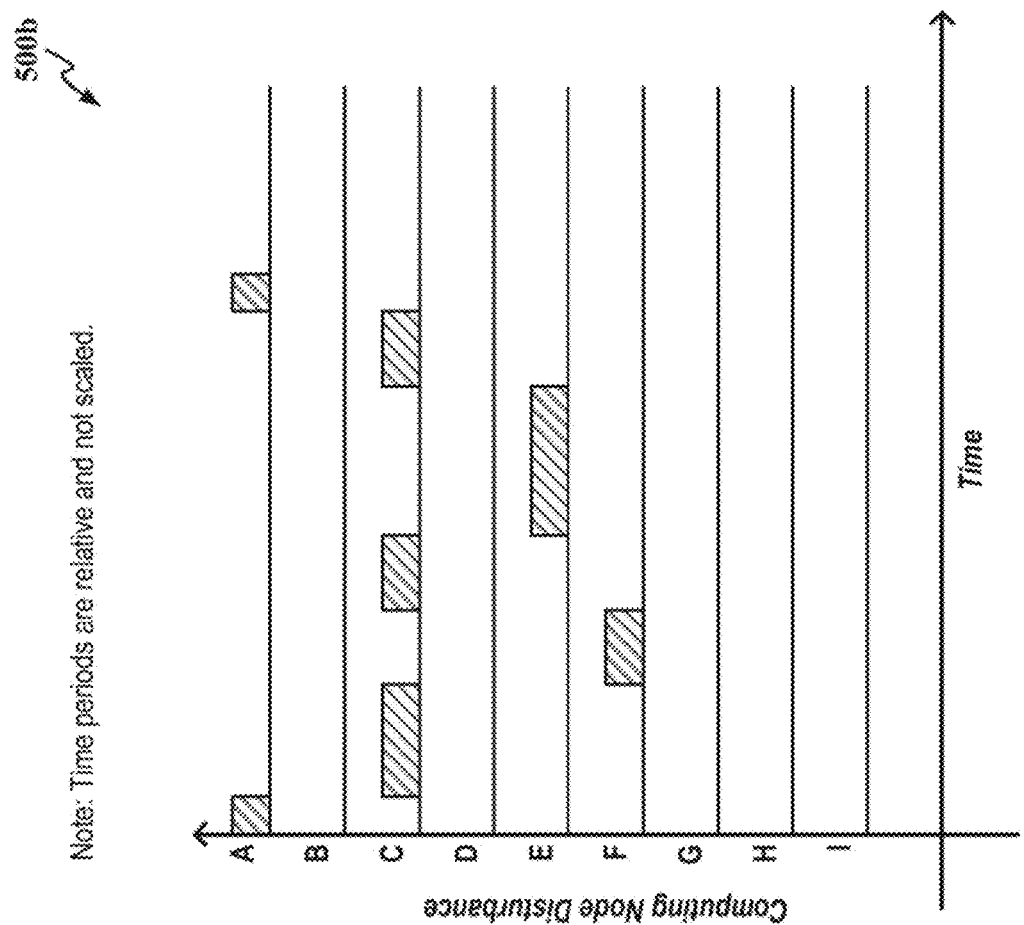
Figure 5:
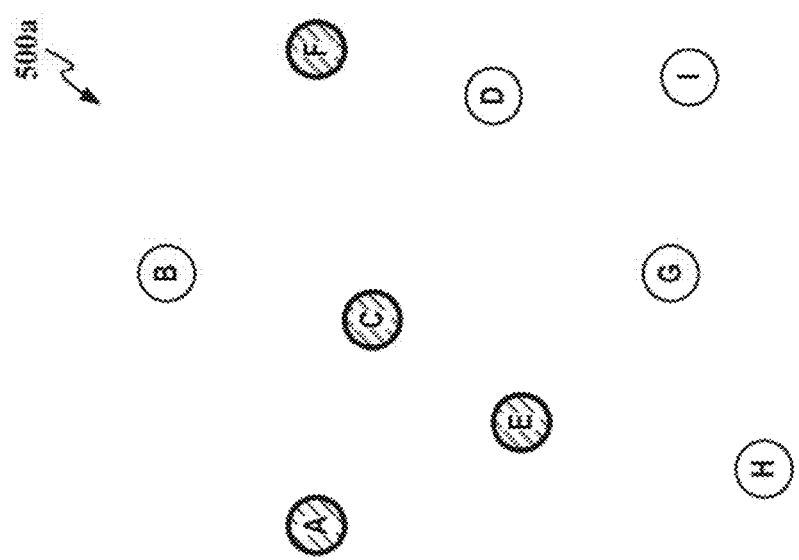

FIG. 4 includes a compute node space diagram 400a that illustrates a compute node environment with nine (9) compute nodes A-I; and a node disturbance graph 400b that illustrates disturbances of each of the compute nodes A-I generated over time. In the scenario illustrated in FIG. 4, all of the compute nodes A-I are in an idle-state where there is no API call made to any of the compute nodes A-I.

FIGS. 5-10 illustrate where the compute nodes A-I in the compute node space are subject to disturbances due to API calls. For example, FIG. 5 includes a compute node space diagram 500a illustrating the compute node environment; and a node disturbance graph 500b that illustrates disturbances of certain ones of the compute nodes A-I generated over time caused by the propagation of an API-1. Specifically, the disturbance due to the API-I through compute nodes A, C, F, and F is shown in the node disturbance graph 500b. The node disturbance sequence due to the API calls from the API-1 is also shown in FIG. 11, which contains a table 1100 illustrating compute node disturbance sequences determined from the node disturbances related to the API calls, where:

API-1: A→C→F→C→E→C→A

It should be noted that the sequence of propagation of the node disturbances through the compute nodes may be referred to as a "node disturbance propagation sequence," a "disturbance propagation sequence," a "disturbance sequence," a "propagation sequence," or similar forms thereof. The propagation sequence may include traversing one or more computing nodes more than once. In one embodiment, the propagation sequence may include this information, thereby including complete information about the sequence of propagation of the node disturbances through the compute nodes.

Figure 6:
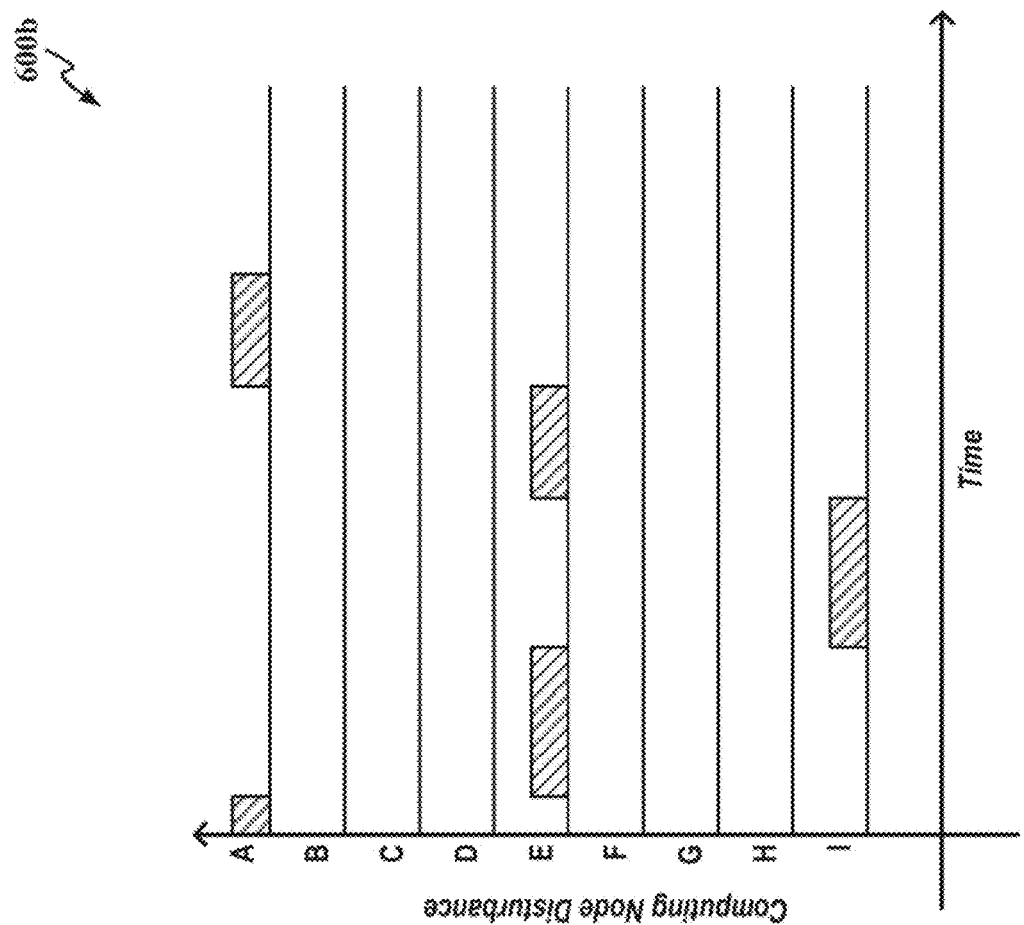
Figure 6:
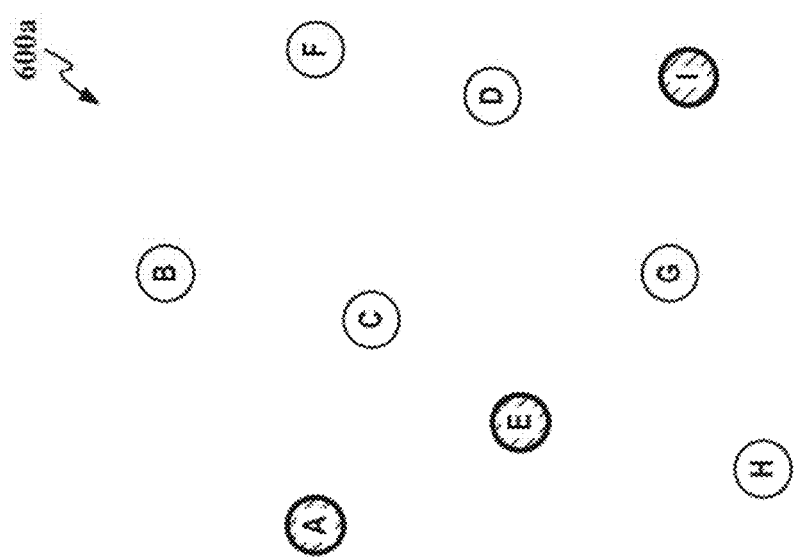

FIG. 6 includes a compute node space diagram 600a illustrating the compute node environment; and a node disturbance graph 600b that illustrates disturbances of certain ones of the compute nodes A-I generated over time caused by the propagation of API-2. Specifically, the disturbance due to the API-2 through compute nodes A, E, and I is shown in the node disturbance graph 600b.

Figure 7:
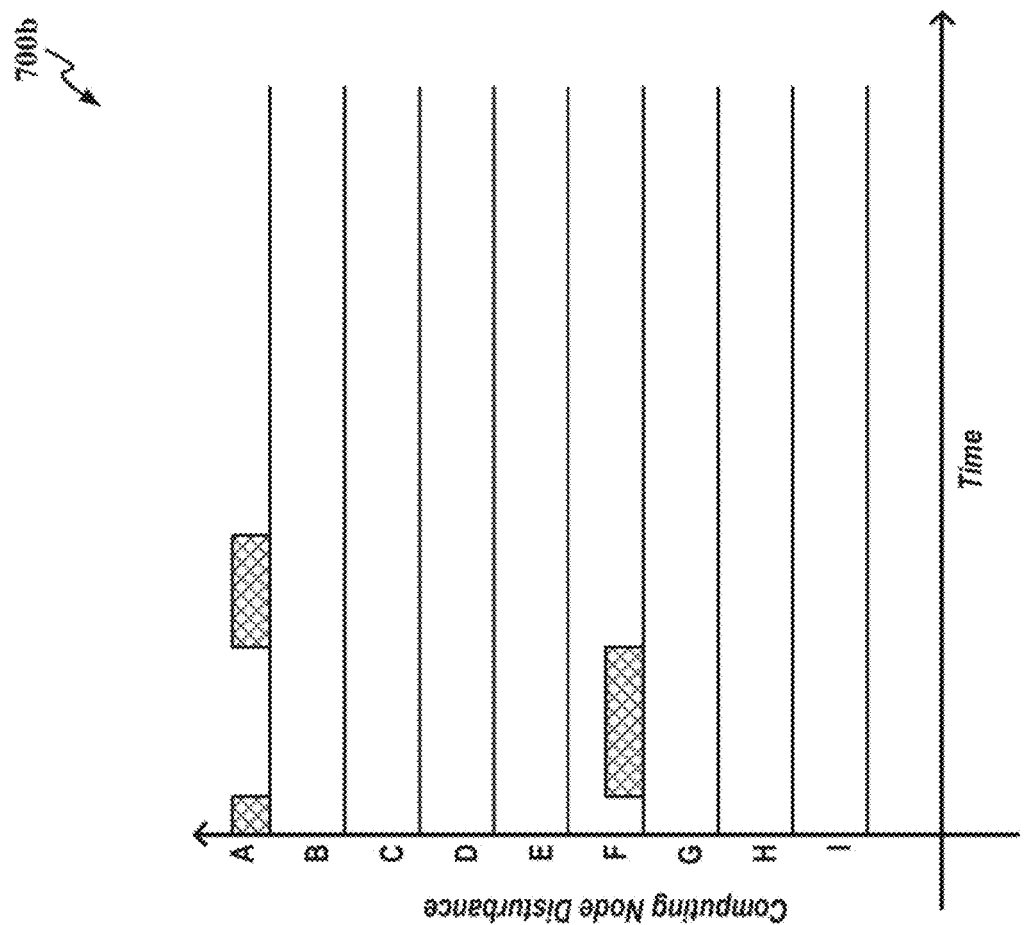
Figure 7:
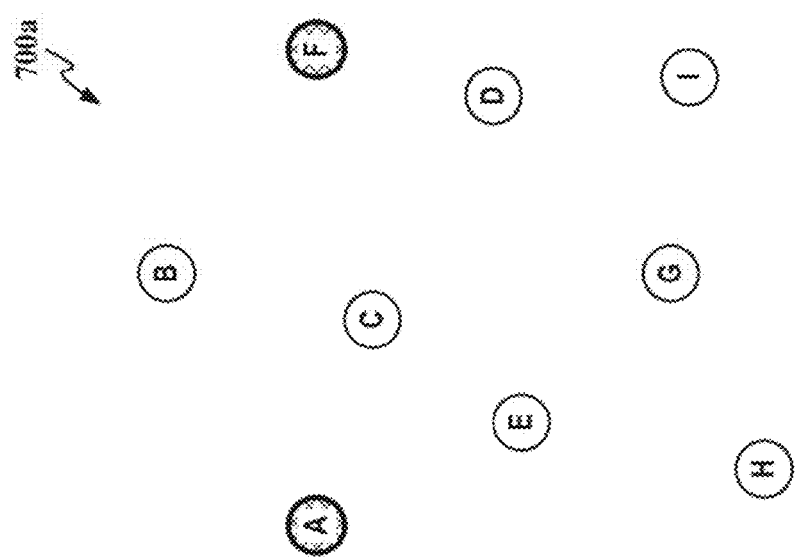

FIG. 7 includes a compute node space diagram 700a illustrating the compute node environment; and a node disturbance graph 700b that illustrates disturbances of certain ones of the compute nodes A-I generated over time caused by the propagation of an API-3. Specifically, the disturbance due to the API-3 through compute nodes A and F is shown in the node disturbance graph 700b.

Figure 8:
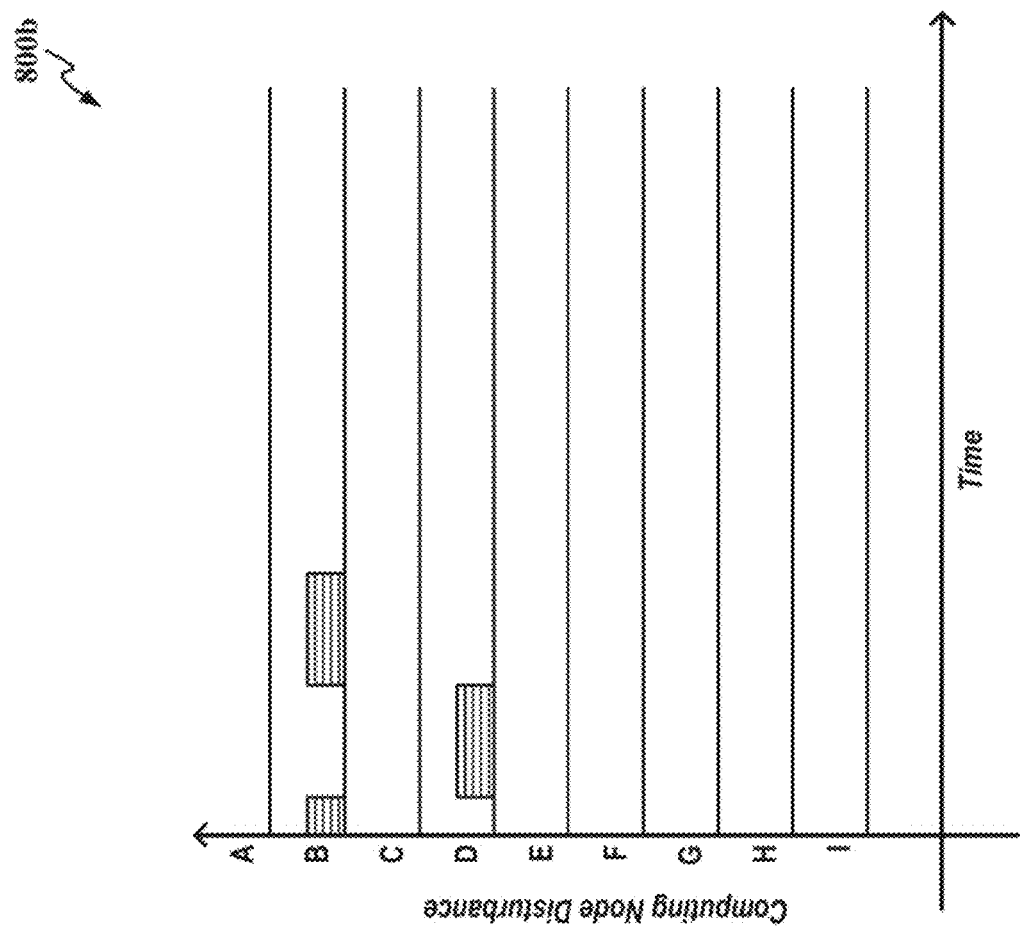
Figure 8:
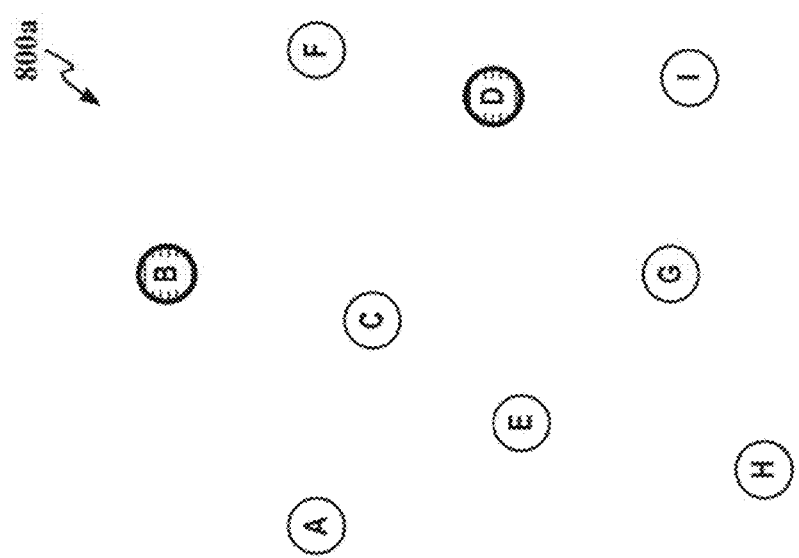

FIG. 8 includes a compute node space diagram 800a illustrating the compute node environment; and a node disturbance graph 800b that illustrates disturbances of certain ones of the compute nodes A-I generated over time caused by the propagation of an API-4. Specifically, the disturbance due to the API-4 through compute nodes B and D is shown in the node disturbance graph 800b.

Figure 9:
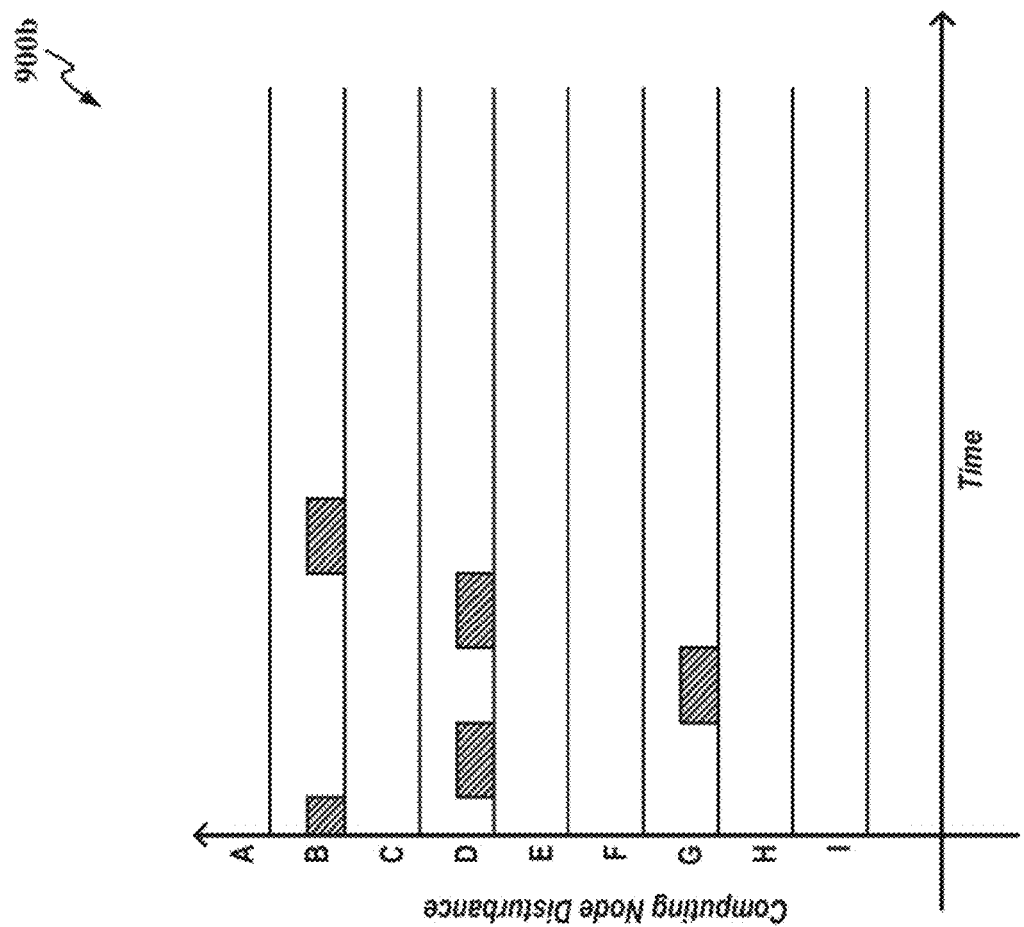
Figure 9:
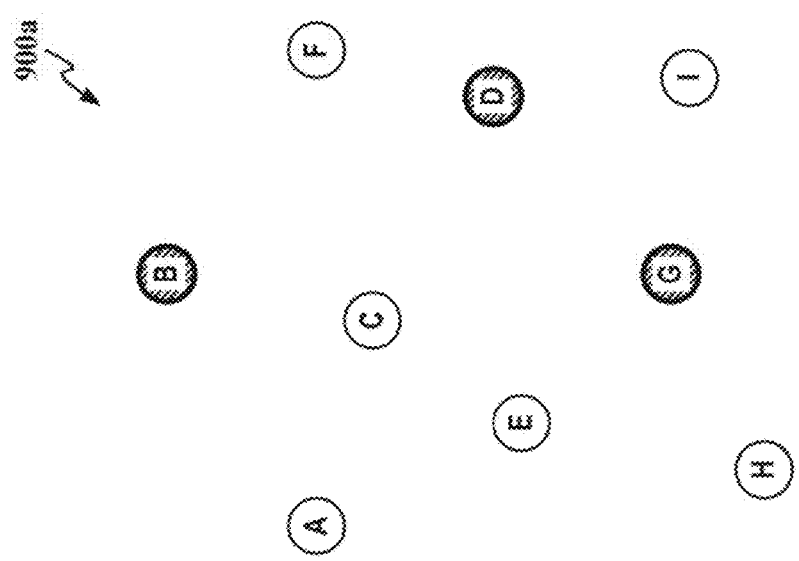

FIG. 9 includes a compute node space diagram 900a illustrating the compute node environment; and a node disturbance graph 900b that illustrates disturbances of certain ones of the compute nodes A-I generated over time caused by the propagation of an API-5. Specifically, the disturbance due to the API-5 through compute nodes B, D, and G is shown in the node disturbance graph 900b.

Figure 10:
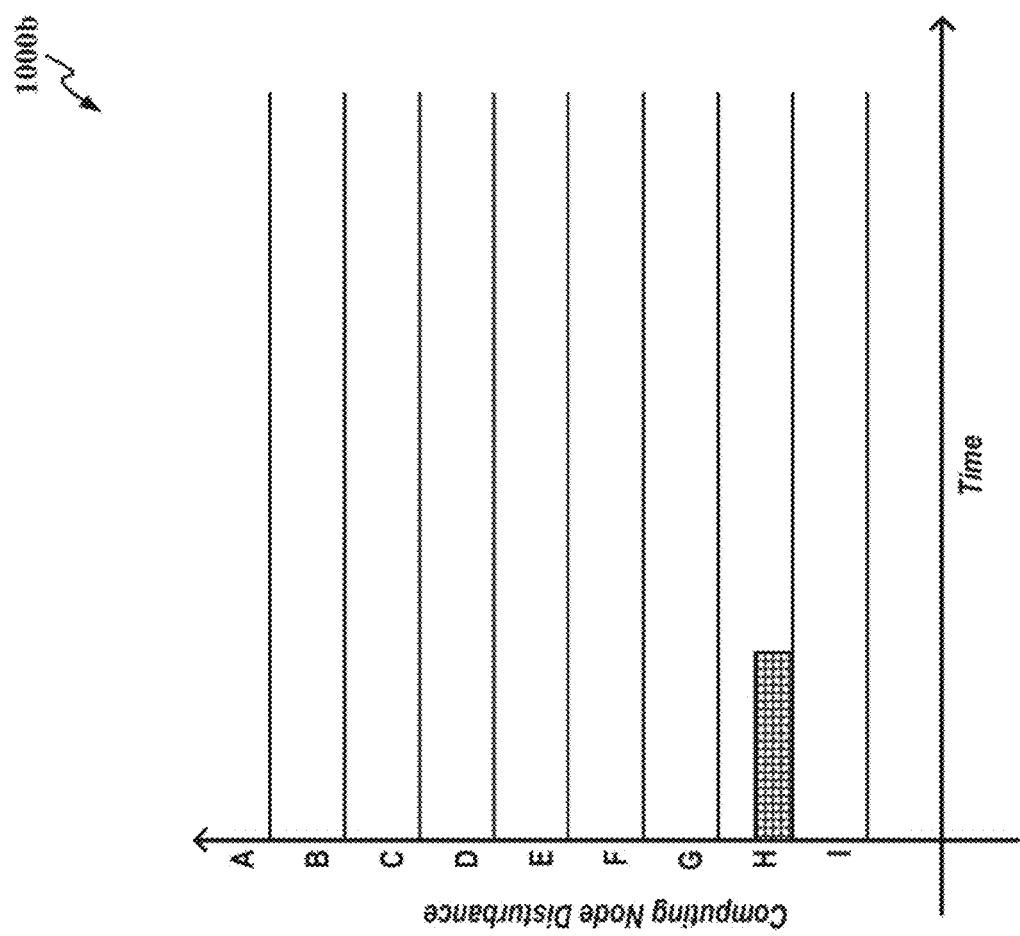
Figure 10:
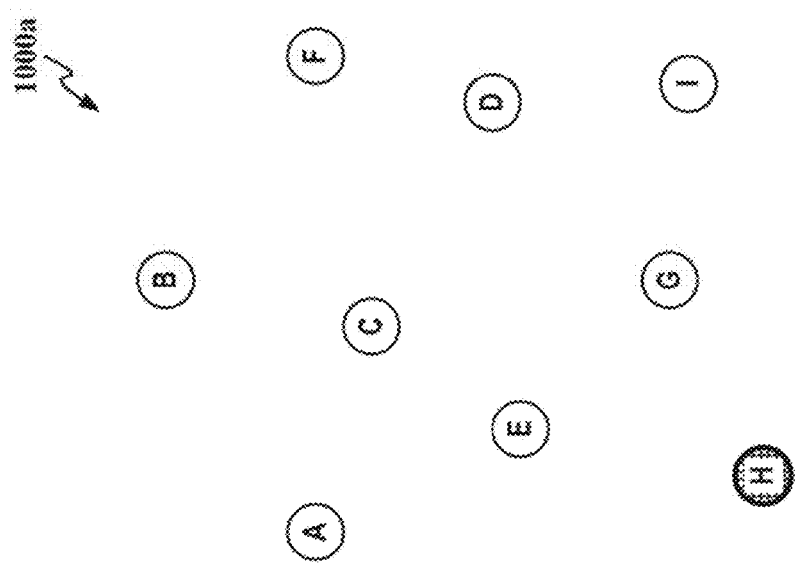
Figure 11:
FIG. 11 is a table illustrating compute node disturbance sequences determined from the node disturbances related to the API calls in accordance with an embodiment of the invention.
Figure 11:
Figure 11:
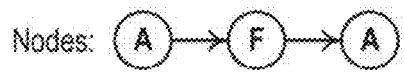
Figure 11:
Figure 11:
Figure 11:
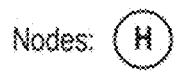

FIG. 10 includes a compute node space diagram 1000a illustrating the compute node environment; and a node disturbance graph 1000b that illustrates disturbances of certain ones of the compute nodes A-I generated over time caused by the propagation of an API-6. Specifically, the disturbance due to the API-6 through compute node H is shown in the node disturbance graph 1000b.

The node disturbance sequences determined based on the calls for APIs API-2 to API-6 are also shown in FIG. 11, where:

API-2: A→E→I→E→A
API-3: A→F→A
API-4: B→D→B
API-5: B→D→G→D→B
API-6: H

Figure 12:
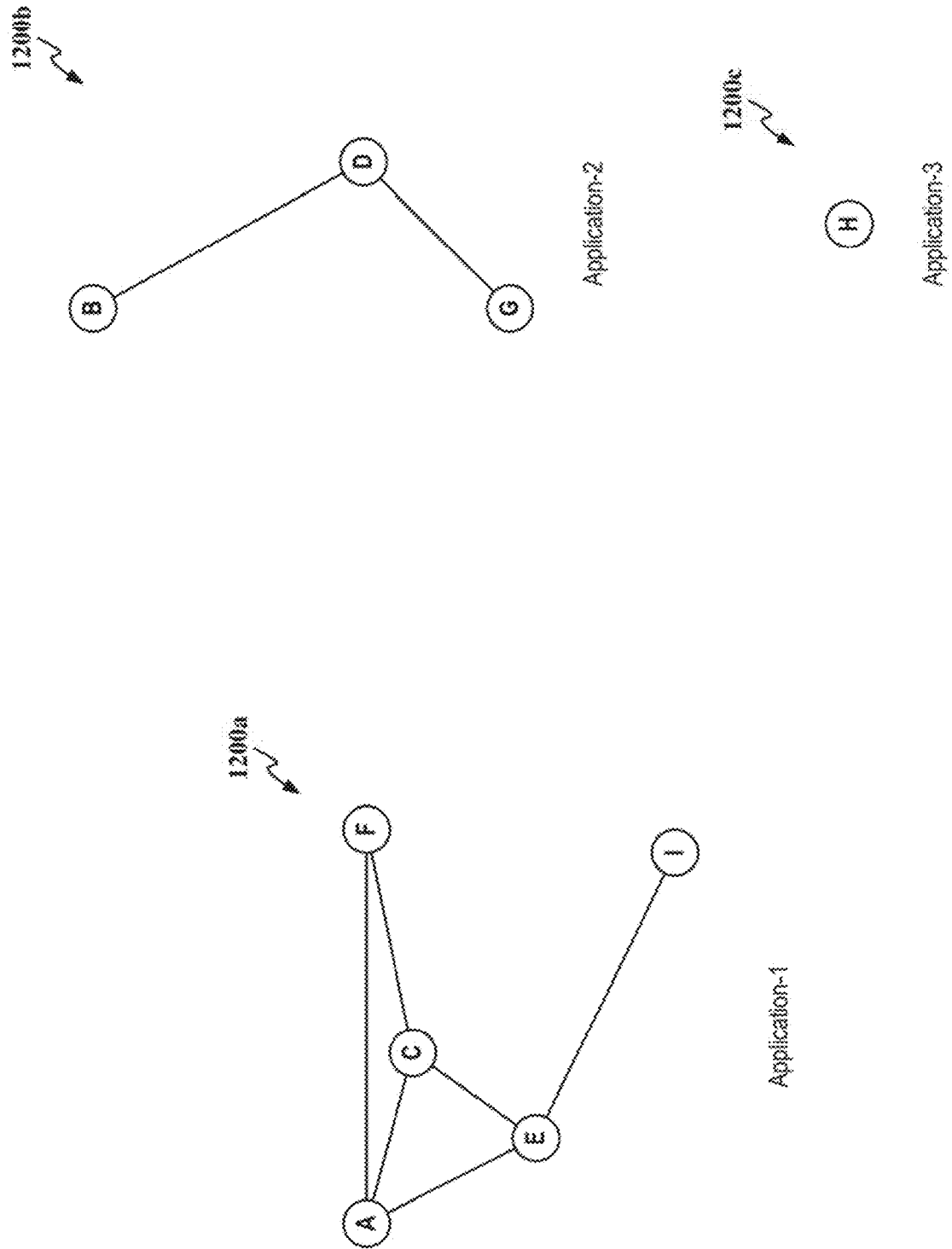
FIG. 12 illustrates various combined inferred connected subgraphs that describe application topologies that may be constructed using the computing node disturbance sequences from FIG. 11.

FIG. 12 illustrate various combined inferred connected subgraphs that describe application topologies that may be constructed using the computing node disturbance sequences from FIG. 11. For example, a topology 1200a of an Application-1, distributed over compute nodes A, C, E, F, and I, may be created by the combination of the disturbance sequences of API-1 (involving compute nodes A, C, E, and API-2 (involving compute nodes A, E, and I), and API-3 (involving compute nodes A and F). A topology 1200b of an Application-2, distributed over compute nodes B, D, and G, may be created by the combination of the disturbance sequences of API-4 (involving compute nodes B and D), and API-5 (involving compute nodes B, D, and G). A topology 1200c of an Application-3, processed by compute node H, may be created from examination the disturbance sequences of API-6 (involving only compute node H).

In the hypothetical scenario discussed above, only a single API call is being made at a time. However, in realistic scenarios, since there may be multiple processing for different API calls on a compute node performed in parallel, some of the detected node disturbances may be due to multiple, overlapping processing. In other words, there may be multiple API calls propagating through the compute node space simultaneously and it is not trivial to infer actual individual API flows from captured node disturbances because changes in CPU utilization metrics may be due to the processing of multiple APIs. Various aspects of the disclosure provide for accurately identifying and attributing each node disturbance sequence to a respective API call.

Returning to FIG. 2, the application topology determination operation illustrated by the process flow diagram 200 may be used to infer application topology in realistic scenarios. In general, the process flow diagram 200 includes performing a metric pattern analysis. The process flow diagram 200 begins at block 202, where CPU utilization metrics are collected for all compute nodes. In one embodiment, the collected CPU utilization metrics are of a duration X. In addition, each CPU utilization metric may be a percentage of CPU utilization over that period of time. These CPU utilization metrics are represented as vectors. For example, assume a compute node space that includes M nodes denoted by $N_1, N_2, N_3, \ldots, N_M$. At a particular time, $T_y$, the utilization-metric of all nodes are captured for a duration of X seconds as corresponding vectors $C_{N1}, C_{N2}, C_{N3}, \ldots, C_{NM}$. In one embodiment, the CPU utilization metric may be represented as a percentage of CPU utilization.

For example, if a CPU utilization metric is created by collecting CPU utilization for compute node $N_1$ for 10 milliseconds, with a granularity of one (1) millisecond, there will be ten (10) values of CPU utilization in the CPU utilization metric $C_{N1}$, where:

$C_{N1}$=[22.3, 10.2, 4, 80.0, 5, 5, 5, 1, 90, 10]

At block 204, a super-vector may be generated from all the vectors of CPU utilization metrics collected in block 202. In one aspect of the disclosure, this may be represented as:

$V_{Tw} = C_{N1}: C_{N2}: C_{N3}: \ldots :C_{NM}$, where the operator ":" denotes a concatenation operation, and "$V_{Tw}$" refers to the super-vector generated from the concatenation of the vectors captured at time $T_w$.

For example, consider a hypothetical where:

$C_{N1}$=[1, 2, 3, 1]
$C_{N2}$=[4, 5, 1, 2]
$C_{N3}$=[1, 1, 2, 1]

then:

$V_{Tw}$=CN1: CN2: CN3=[1, 2, 3, 1, 4, 5, 1, 2, 1, 1, 2, 1].

At block 210, a determination is made of whether a sufficient number of samples are collected. In an embodiment, a Y-number of samples, where Y is a sufficiently large samples of states of the compute node space with one or more API calls, corresponds to the set of resultant mixed signal samples for the M-number of nodes. If a sufficient number of samples has not been collected, then operation returns to block 202. Once a sufficient number of samples has been collected, operation proceeds to block 212.

Figure 13:
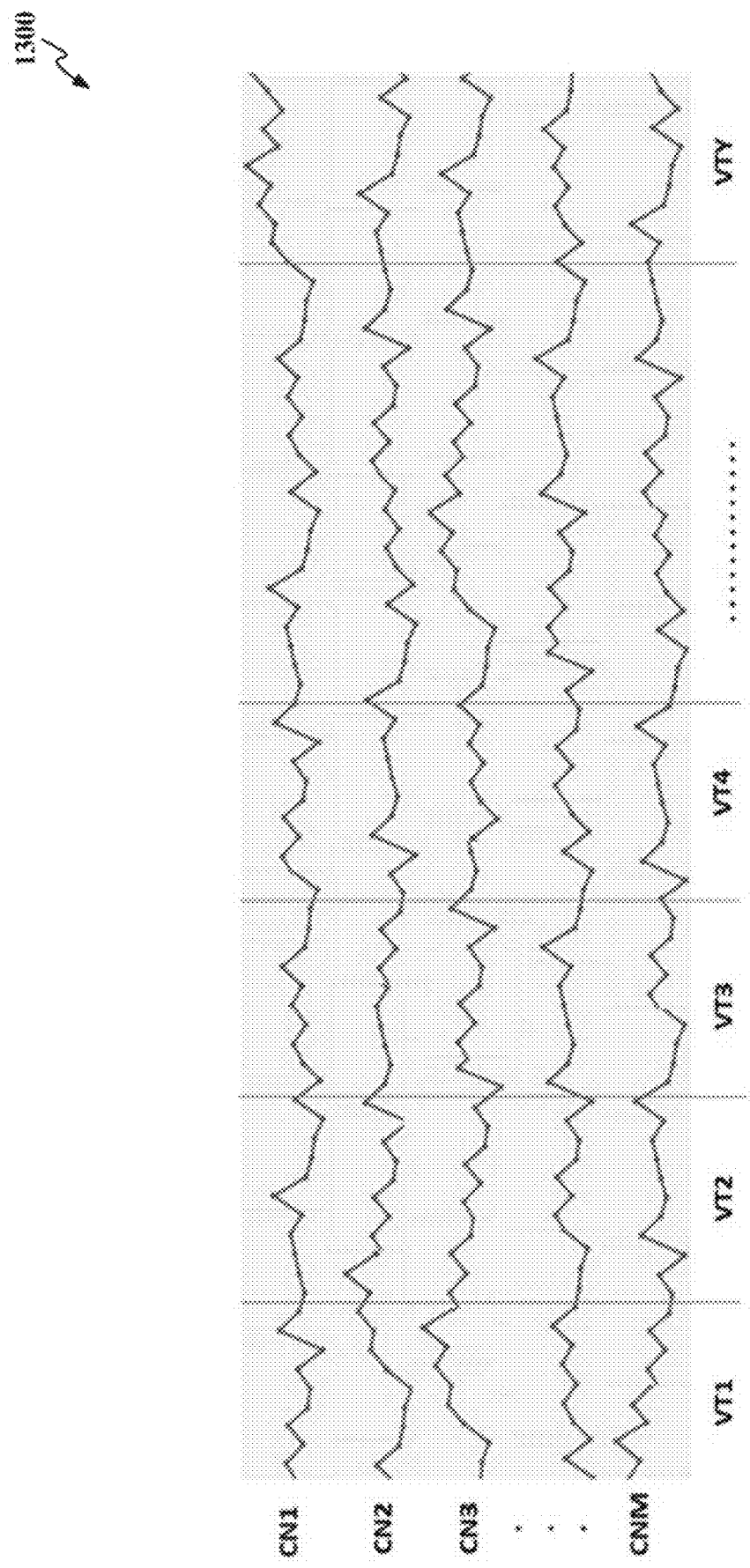
FIG. 13 is a graph of super-vectors generated from CPU utilization metrics of all computing nodes in accordance with an embodiment of the invention.

For example, if samples with a duration X of one (1) second are collected over a period of twenty-four (24) hours, then 24*60*60=86,400 super-vectors may be created. Thus, one super-vector for each second of the day describing the state of all the compute nodes in terms of the considered utilization metric may be created. FIG. 13 illustrates a plurality Y of super-vectors 1300 ($V_{T1}$ to $V_{TY}$) generated from the vectors associated with the CPU utilization metrics gathered of all computing nodes.

At block 212, because the signals represented by super-vectors are not smooth, this data is smoothed to remove the noise and increase the signal-to-noise ratio. The smoothed data is used as an input to a unique node disturbance sequence determination algorithm.

Figure 14:
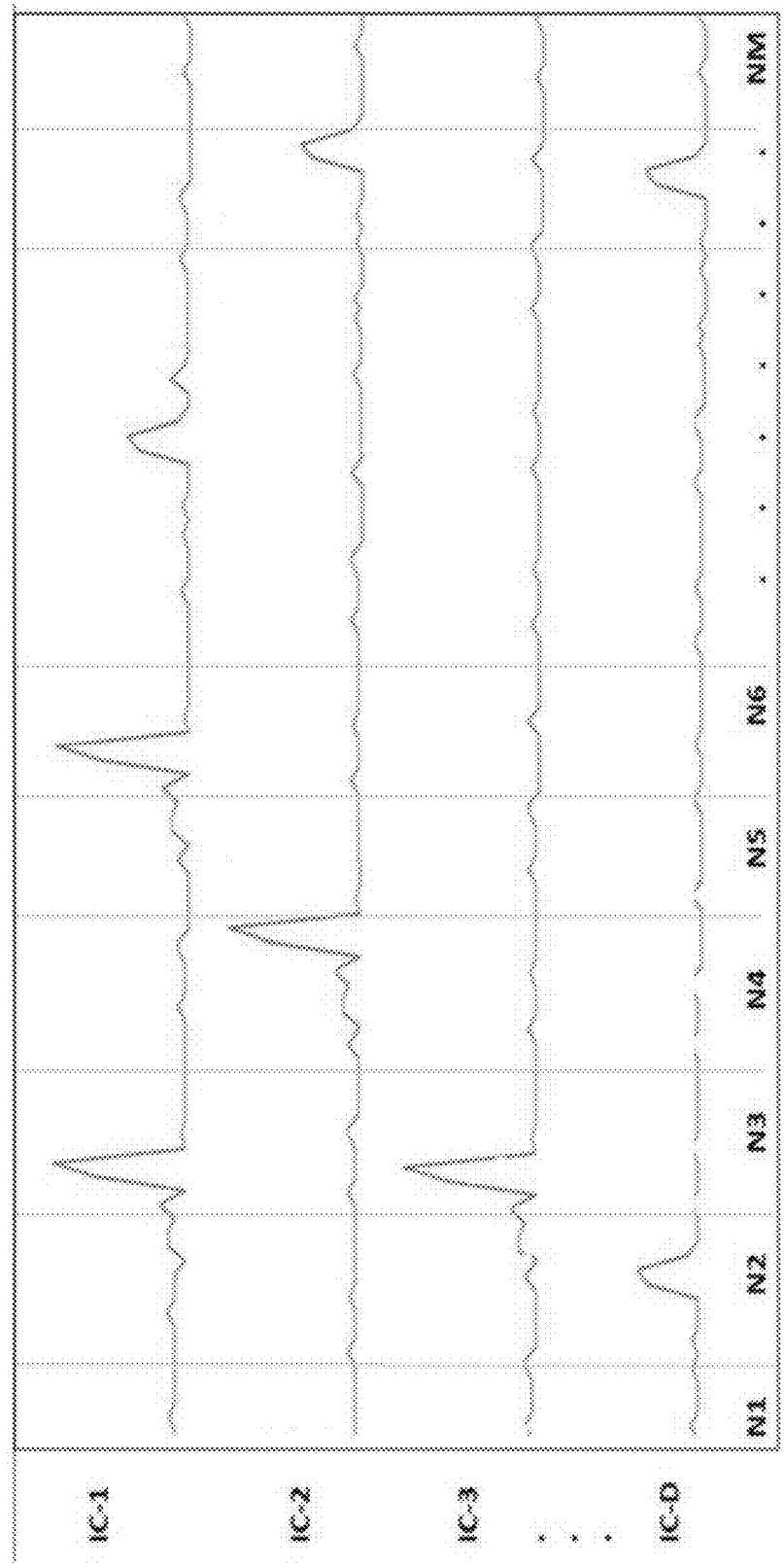
FIG. 14 is a graph of independent component vectors generated by independent component analysis in accordance with an embodiment of the invention.

At block 214, the unique node disturbance sequence determination algorithm may be used to extract unique components (patterns) from a given set of super-vectors. In one embodiment, a signal-processing technique such as the Independent Component Analysis (ICA) algorithm may be used to identify the unique node disturbance sequences. These node disturbance sequences correspond to various APIs calls from the set of mixed signals, which represent the resultant node disturbances. The ICA algorithm is a type of Blind-Source Separation (BSS) algorithm that may be used in signal-processing domain to split the signals into the component signals. In other words, a signal processing approach such as the BSS algorithm may be used to identify and segregate the flow of different API calls using unique repetitive patterns. FIG. 14 is a graph of independent component vectors generated by independent component analysis in accordance with an embodiment of the invention.

At block 216, the node disturbance sequences obtained through the BSS algorithm may be combined and modelled as graphs to identify the connected components (i.e., the application topology) similar to that as shown by FIG. 12. Specifically, the node disturbance sequences (independent components) identified using the ICA algorithm are modelled as a graph and a connected component algorithm may be utilized to identify the connected sub-graphs. The connected sub-graphs thus generated represent the set of applications and their respective topologies.

Figure 2:
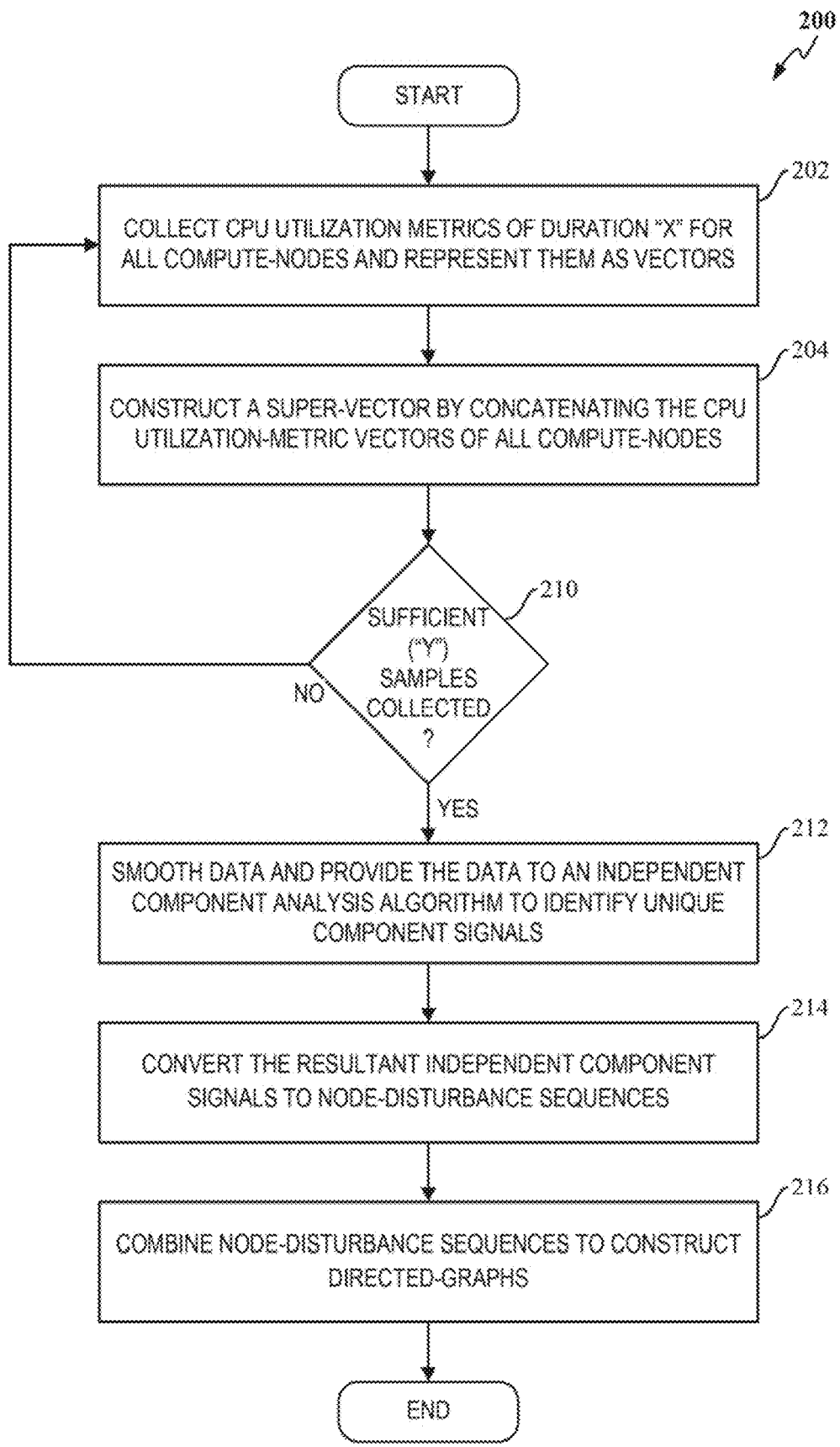
FIG. 2 is a flow diagram of an operation for agentless platform-agnostic application topology discovery using CPU utilization metrics in accordance with an embodiment of the invention.
Figure 3:
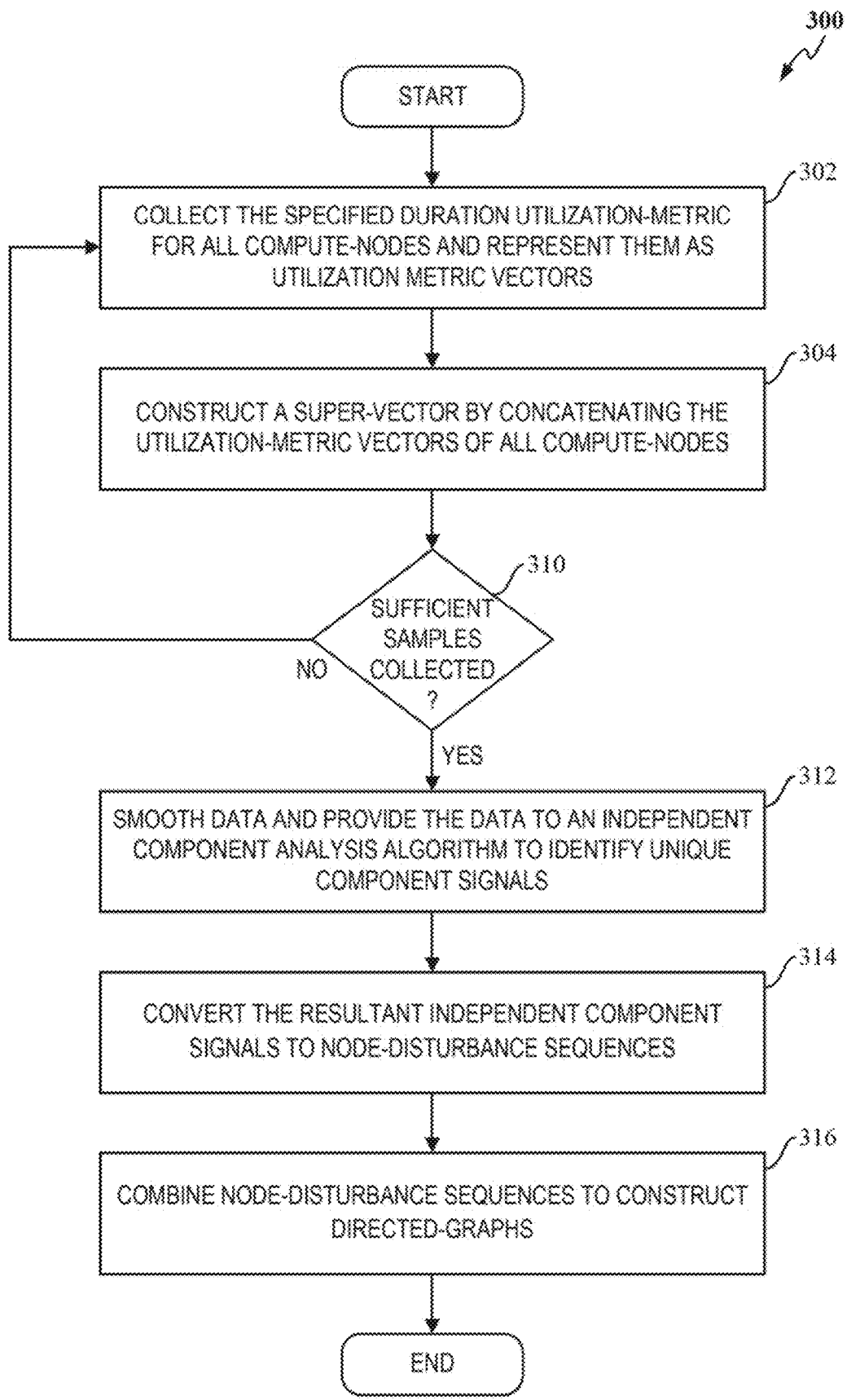
FIG. 3 is a flow diagram of a generalized operation for agentless platform-agnostic application topology discovery in accordance with an embodiment of the invention.

The example provided in association with the description of FIG. 2 for performing application topology determination discuss using CPU utilization of compute nodes as a metric for node disturbance capture and analysis. FIG. 3 illustrates how various aspects of the disclosure may be used with other types of resources related to compute nodes for the application topology determination operation, illustrated by a process flow diagram 300. The process flow diagram 300 begins at block 302 where, similar to block 202 of FIG. 2, utilization metrics are collected for all compute nodes and represented as utilization metric vectors. For example, network utilization of each compute node may be a utilization metric that may be used instead of, or in addition to, CPU utilization. At block 304, a super-vector is constructed using the utilization metric vectors from the operation at block 302, similar to block 204 of FIG. 2.

Next, at block 310, a determination is made of whether enough samples have been collected to create a sufficient number of super-vectors to continue the operation with block 312 where, similar to block 212 of FIG. 2, the data is smoothed out and provided to a unique node disturbance sequence determination algorithm. At block 314, node disturbance sequences are created from the unique node disturbance sequence determination algorithm, which may be the ICA algorithm discussed above with respect to block 214 of FIG. 2. At block 316, the node disturbance sequences are combined to construct directed graphs for determining application topology. In one embodiment, a directed graph (digraph), which is a graph created from a set of vectors connected by edges, may be used because the node disturbance sequences have a directionality in terms of the propagation of node disturbance (i.e., order of execution of each API). In other embodiments, other types of graphs, such as undirected graphs or multigraphs, may be used where directionality of propagation is not used to determine the compute nodes associated with an API and, ultimately, an application.

Figure 15:
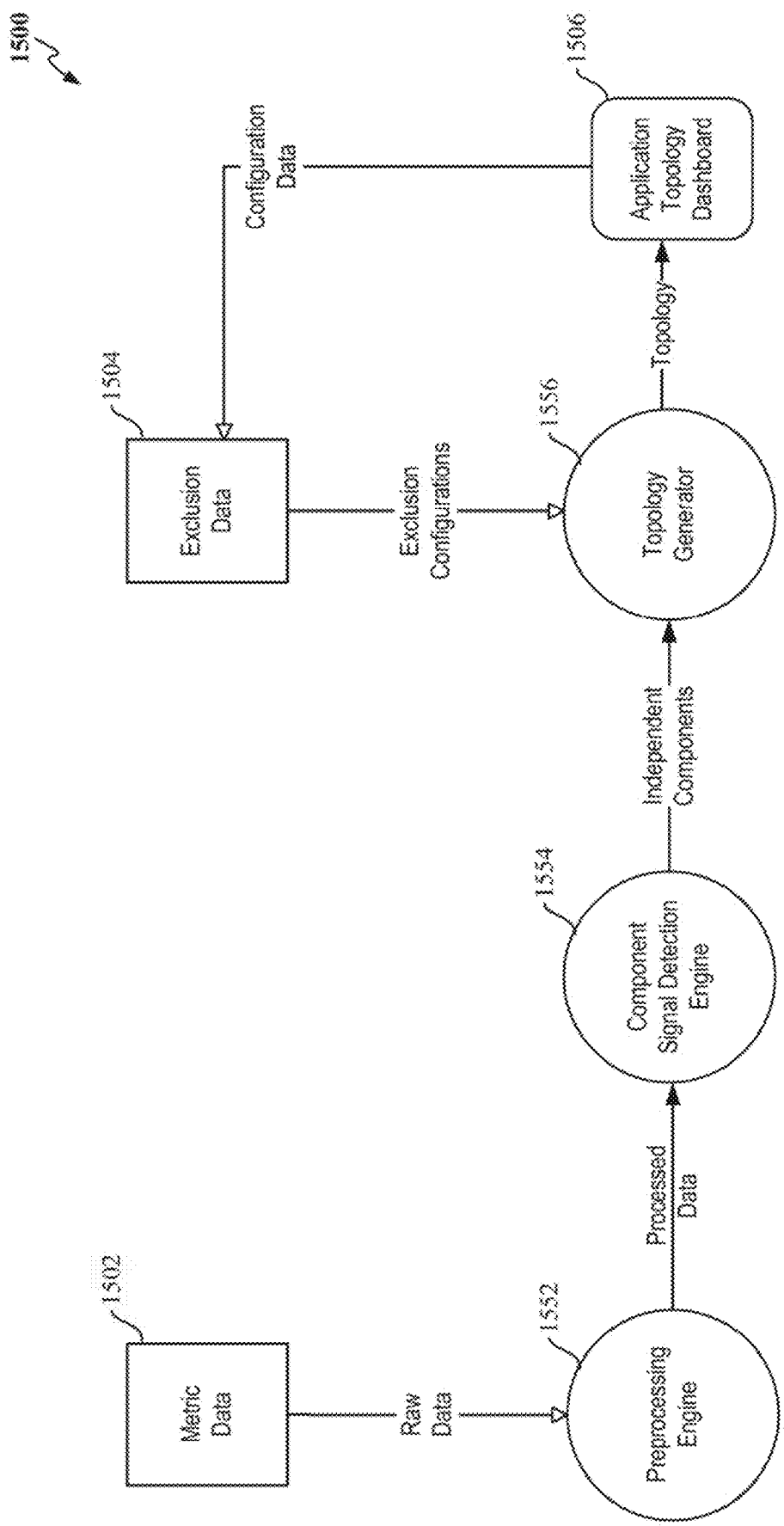
FIG. 15 is a block diagram of an architecture for agentless platform-agnostic application topology discovery in accordance with an embodiment of the invention.

FIG. 15 illustrates of an application topology discovery architecture 1500 configured in accordance with an embodiment of the invention. In one embodiment, the application topology discovery architecture 1500 may be used to implement the application topology discovery manager 170 in FIG. 1.

The architecture 1500 includes a preprocessing engine 1552 that receives metric data 1502. The metric data 1502 may include the various resource utilization metrics described above, such as CPU resource utilization or network resource utilization. As an example, the network utilization metric data can be collected in an agentless manner by directly using platform APIs such as Cloud Infrastructure APIs (e.g., vCenter APIs for VMs) or cAdvisor APIs for Container and Kubernetes Pods.

The preprocessing engine 1552 smooths the metric data 1502 to create processed metric data. In an embodiment, to smooth the metric data 1502, the preprocessing engine 1552 removes noise from the metric data 1502. By way of example and not limitation, a filter such as a Savitzky-Golay filter may be used to remove noise from the metric data 1502.

The processed data created from smoothing the metric data 1502 is fed into a component signal detection engine 1554 that identifies any unique repetitive patterns (independent component patterns/signals) contained therein. As discussed above, the metric data 1502 contains mixed data (signals), and the component signal detection engine 1554 serves to separate out each independent component signal. These independent component signals are provided to a topology generator 1556 that models them as a graph from which the connected subgraphs are computed.

Continuing to refer to FIG. 15, there may be scenarios where it is impossible for an agentless approach for application topology determination to differentiate between different applications and construct an accurate application topology. These scenarios generally involve situations where a set of two or more different applications may appear to be a single application to the application topology discovery architecture 1500. For example, one application may interact with one or more other applications using API calls. In another example, a set of different applications may be related to some common gateway service. Such applications will be considered a part of a single application as there are interactions between these applications via API calls. Thus, it may be impossible to identify such cases and treat them as different applications. In order to address this issue, in one embodiment a user interface (not show) such as a topology dashboard 1506 may be provided for a user to provide configuration data that directs the topology generator 1556 to exclude links between these applications. This configuration data is stored as exclusion data 1504 and provided to the topology generator 1556 as exclusion configurations. The topology generator 1556 will exclude any links in these exclusion configurations during a determination of the application topology.

Figure 16:
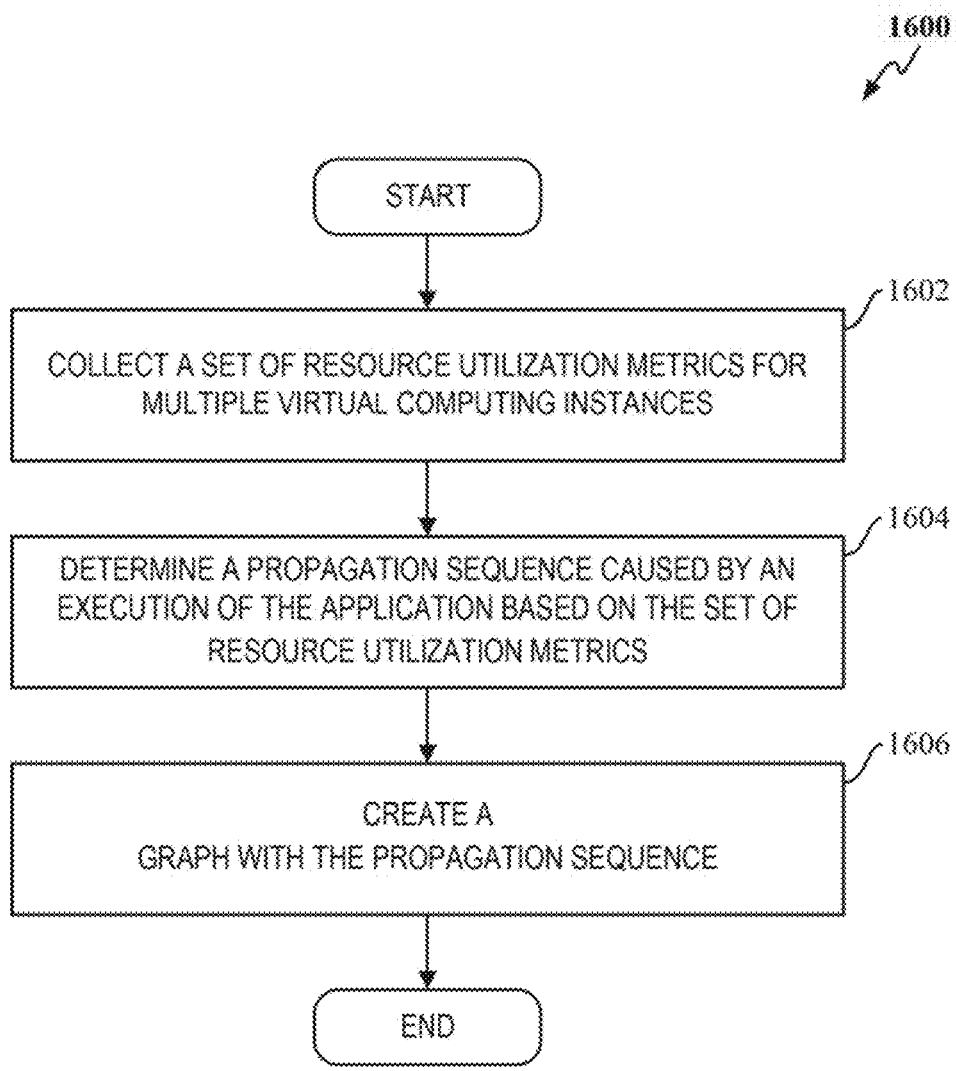
FIG. 16 is a flow diagram of an operation for constructing a topology for an application distributed over multiple virtual computing instances in accordance with an embodiment of the invention.

A computer-implemented method for constructing a topology for an application distributed over multiple virtual computing instances in accordance with an embodiment of the invention is described with reference to a flow diagram 1600 of FIG. 16. At block 1602, a set of resource utilization metrics for the multiple virtual computing instances is collected. At block 1604, a propagation sequence caused by an execution of the application is determined based on the set of resource utilization metrics. At block 1606, a graph with the propagation sequence is created. In one embodiment, each virtual computing instance in the multiple computing instances is a possible node in the graph and the graph includes all nodes associated with the application.

The present invention provides an agentless solution that may meet the critical requirements of Cloud-Ops teams using an out-of-the-box approach that may automate application topology discovery while ensuring zero performance and security impacts. In addition, this approach includes low maintenance overhead because it does not require additional services be added to the existing cloud infrastructure.

Although the operations of the approaches herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or as arrangements of parts so described and illustrated. The scope of the invention is to be defined by the claims appended hereto and their equivalents.

What is claimed is:

1. A computer-implemented method for constructing a topology for an application distributed over multiple virtual computing instances, the method comprising:
   collecting a set of resource utilization metrics for the multiple virtual computing instances, wherein the set of resource utilization metrics comprise a first subset of resource utilization metrics for the application, and a second subset of resource utilization metrics for a second application distributed over at least one virtual computing instance in the multiple virtual computing instances;
   determining a propagation sequence caused by an execution of the application based on the set of resource utilization metrics, wherein the determining of the propagation sequence comprises:
      identifying the first subset of resource utilization metrics for the application in the set of resource utilization metrics;
      separating the first subset of resource utilization metrics from the set of resource utilization metrics; and
      determining a sequence of disturbances in the multiple virtual computing instances based on the first subset of resource utilization metrics; and
   creating a graph with the propagation sequence, wherein each virtual computing instance in the multiple computing instances is a possible node in the graph and the graph comprises all nodes associated with the application.

2. The method of claim 1, wherein the collecting of the set of resource utilization metrics comprises:
   creating a set of vectors, wherein each vector comprises a resource utilization metric for the at least one virtual computing instance; and
   concatenating the set of resource utilization metrics to create a super-vector comprising the set of vectors.

3. The method of claim 1, wherein the resource utilization metrics comprises at least one of network and processor resource utilization metrics associated with the multiple virtual computing instances.

4. The method of claim 1, wherein the set of resource utilization metrics comprises utilization metrics associated with multiple applications, each of which is distributed over at least one of the multiple virtual computing instances, the method further comprising:
   identifying propagation sequences of API calls associated with the application via a component signal analysis of the set of resource utilization metrics; and
   aggregating the propagation sequences to identify the at least one of the multiple virtual computing instances over which the application is distributed.

5. The method of claim 1, wherein the propagation sequence is expressed in a set of vectors, and the graph comprises a directed graph constructed from the set of vectors.

6. The method of claim 1, wherein the determining of the propagation sequence comprises:
   smoothing signals related to the set of resource utilization metrics to produce smoothed data; and executing a signal-processing technique on the smoothed data to extract unique patterns from the set of resource utilization metrics.

7. The method of claim 6, wherein the signal-processing technique includes at least one of Independent Component Analysis (ICA) algorithm and Blind-Source Separation (BSS) algorithm.

8. A non-transitory computer-readable storage medium containing program instructions for constructing a topology for an application distributed over multiple virtual computing instances, wherein execution of the program instructions by one or more processors causes the one or more processors to perform steps comprising:
  collecting a set of resource utilization metrics for the multiple virtual computing instances, wherein the set of resource utilization metrics comprise a first subset of resource utilization metrics for the application, and a second subset of resource utilization metrics for a second application distributed over at least one virtual computing instance in the multiple virtual computing instances;
  determining a propagation sequence caused by an execution of the application based on the set of resource utilization metrics, wherein the determining of the propagation sequence comprises the steps of:
    identifying the first subset of resource utilization metrics for the application in the set of resource utilization metrics;
    separating the first subset of resource utilization metrics from the set of resource utilization metrics; and
    determining a sequence of disturbances in the multiple virtual computing instances based on the first subset of resource utilization metrics; and
  creating a graph with the propagation sequence, wherein each virtual computing instance in the multiple computing instances is a possible node in the graph and the graph comprises all nodes associated with the application.

9. The computer-readable storage medium of claim 8, wherein the collecting of the set of resource utilization metrics comprises the steps of:
  creating a set of vectors, wherein each vector comprises a resource utilization metric for the at least one virtual computing instance; and
  concatenating the set of resource utilization metrics to create a super-vector comprising the set of vectors.

10. The computer-readable storage medium of claim 8, wherein the resource utilization metrics comprises at least one of network and processor resource utilization metrics associated with the multiple virtual computing instances.

11. The computer-readable storage medium of claim 8, wherein the set of resource utilization metrics comprises utilization metrics associated with multiple applications, each of which is distributed over at least one of the multiple virtual computing instances, and the execution of the program instructions by one or more processors further causes the one or more processors to perform steps comprising:
  identifying propagation sequences of API calls associated with the application via a component signal analysis of the set of resource utilization metrics; and
  aggregating the propagation sequences to identify the at least one of the multiple virtual computing instances over which the application is distributed.

12. The computer-readable storage medium of claim 8, wherein the propagation sequence is expressed in a set of vectors, and the graph comprises a directed graph constructed from the set of vectors.

13. The computer-readable storage medium of claim 8, wherein the determining of the propagation sequence comprises:
  smoothing signals related to the set of resource utilization metrics to produce smoothed data; and
  executing a signal-processing technique on the smoothed data to extract unique patterns from the set of resource utilization metrics.

14. The computer-readable storage medium of claim 13, wherein the signal-processing technique includes at least one of Independent Component Analysis (ICA) algorithm and Blind-Source Separation (BSS) algorithm.

15. A system of multiple virtual computing instances including an application distributed over the multiple virtual computing instances, the system comprising:
  memory; and
  one or more processors configured to:
    collect a set of resource utilization metrics for the multiple virtual computing instances, wherein the set of resource utilization metrics comprise a first subset of resource utilization metrics for the application, and a second subset of resource utilization metrics for a second application distributed over at least one virtual computing instance in the multiple virtual computing instances;
    determine a propagation sequence caused by an execution of the application based on the set of resource utilization metrics; and
    create a graph with the propagation sequence, wherein each virtual computing instance in the multiple computing instances is a possible node in the graph and the graph comprises all nodes associated with the application wherein the one or more processors are further configured to:
    identify the first subset of resource utilization metrics for the application in the set of resource utilization metrics;
    separate the first subset of resource utilization metrics from the set of resource utilization metrics; and
    determine a sequence of disturbances in the multiple virtual computing instances based on the first subset of resource utilization metrics.

16. The system of claim 15, wherein the one or more processors are further configured to:
  create a set of vectors, wherein each vector comprises a resource utilization metric for the at least one virtual computing instance; and
  concatenate the set of resource utilization metrics to create a super-vector comprising the set of vectors to collect the set of resource utilization metrics.

17. The system of claim 15, wherein the resource utilization metrics comprises at least one of network and processor resource utilization metrics associated with the multiple virtual computing instances.

18. The system of claim 15, wherein the set of resource utilization metrics comprises utilization metrics associated with multiple applications, each of which is distributed over at least one of the multiple virtual computing instances, and the one or more processors are further configured to:
  identify propagation sequences of API calls associated with the application via a component signal analysis of the set of resource utilization metrics; and
  aggregate the propagation sequences to identify the at least one of the multiple virtual computing instances over which the application is distributed.

19. The system of claim 15, wherein the one or more processors are further configured to:

smooth signals related to the set of resource utilization metrics to produce smoothed data; and execute a signal-processing technique on the smoothed data to extract unique patterns from the set of resource utilization metrics.

20. The system of claim 19, wherein the signal-processing technique includes at least one of Independent Component Analysis (ICA) algorithm and Blind-Source Separation (BSS) algorithm.

* * * * *